(12) United States Patent
Sarukkai et al.

(10) Patent No.: US 12,712,781 B2
(45) **Date of Patent: *Aug. 18, 2026**

(54) MECHANIZED MODIFY/ADD/CREATE/DELETE FOR NETWORK CONFIGURATION

(71) Applicant: AT&T Intellectual Property I, L.P., Atlanta, GA (US)

(72) Inventors: Mukundan Sarukkai, Manalapan, NJ (US); Kevin D'Souza, Yardley, PA (US); Eshrat Huda, Hillsborough, NJ (US); Sunil Maloo, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,494

(22) Filed: May 23, 2024

(65) Prior Publication Data

US 2024/0314031 A1 Sep. 19, 2024

Related U.S. Application Data

(63) Continuation of application No. 18/156,741, filed on Jan. 19, 2023, now Pat. No. 12,034,594, which is a (Continued)

(51) Int. Cl.

*H04L 41/0866* (2022.01)
*H04L 41/0816* (2022.01)
*H04L 41/0853* (2022.01)

(52) U.S. Cl.

CPC ...... *H04L 41/0816* (2013.01); *H04L 41/0853* (2013.01); *H04L 41/0866* (2013.01)

(58) Field of Classification Search

CPC ............. H04L 41/0816; H04L 41/0853; H04L 41/0866; H04L 41/0266; H04L 41/0843; H04L 41/0813

(Continued)

(56) References Cited

U.S. PATENT DOCUMENTS 9,049,044 B1 * 6/2015 Marshall ................. H04L 12/42
10,484,334 B1 * 11/2019 Lee ......................... H04L 67/30

(Continued)

FOREIGN PATENT DOCUMENTS

EP 2838209 A1 2/2015

OTHER PUBLICATIONS

"Non Final Office Action received for U.S. Appl. No. 17/454,153", dated May 11, 2022, 39 Pages.

(Continued)

*Primary Examiner* — Karen C Tang

(74) *Attorney, Agent, or Firm* — Guntin & Gust, PLC; Dana B. LeMoine

(57) ABSTRACT

Techniques for mechanized modify/add/create/delete (MACD) for network configuration are provided. A method can include creating a data object from input data relating to a requested change to a target network configuration, the data object comprising a first parameter indicating a type of the requested change and a second parameter identifying the target network configuration; retrieving, from a repository according to a group of logical rules, executable instructions associated with the type of the requested change, as given by the first parameter of the data object, and the target network configuration, as given by the second parameter of the data object; and performing, further according to the group of logical rules, the requested change to the target network configuration, the performing of the requested change comprising executing the executable instructions retrieved from the repository.

20 Claims, 11 Drawing Sheets

Related U.S. Application Data continuation of application No. 17/454,153, filed on Nov. 9, 2021, now Pat. No. 11,582,098.

(58) Field of Classification Search
USPC .......................................................... 709/224
See application file for complete search history.

(56) References Cited

U.S. PATENT DOCUMENTS 11,115,272 B1 9/2021 Kumar et al.
11,243,989 B1 2/2022 Flanagan et al.
11,386,158 B1 * 7/2022 Bourbie ................ G06F 40/205
11,644,955 B1 * 5/2023 Singamneni .......... G06F 3/0481 707/722
2002/0057018 A1 5/2002 Branscomb et al.
2002/0116485 A1 8/2002 Black et al.
2005/0198247 A1 9/2005 Perry et al.
2007/0245013 A1 * 10/2007 Saraswathy ............ G06Q 10/10 709/224
2014/0173135 A1 6/2014 Varney et al.
2014/0337500 A1 * 11/2014 Lee ....................... H04L 41/122 709/223
2016/0140095 A1 * 5/2016 Park ...................... G06F 40/169 707/736
2016/0337206 A1 11/2016 Bugenhagen et al.
2019/0340281 A1 * 11/2019 Maiti ................ G06F 16/24534
2021/0409271 A1 12/2021 Jacob Da Silva et al.
2022/0035650 A1 * 2/2022 Banerjee ............. H04L 12/4641
2022/0103427 A1 * 3/2022 Mallipudi ................. G06F 8/65

OTHER PUBLICATIONS

"Notice of Allowance received for U.S. Appl. No. 17/454,153", dated Oct. 14, 2022, 43 Pages.

* cited by examiner

MECHANIZED MODIFY/ADD/CREATE/DELETE FOR NETWORK CONFIGURATION

RELATED APPLICATION

The subject patent application is a continuation of, and claims priority to, U.S. patent application Ser. No. 18/156,741, filed Jan. 19, 2023, and entitled "MECHANIZED MODIFY/ADD/CREATE/DELETE FOR NETWORK CONFIGURATION," which is a continuation of U.S. patent application Ser. No. 17/454,153, filed Nov. 9, 2021, and entitled "MECHANIZED MODIFY/ADD/CREATE/DELETE FOR NETWORK CONFIGURATION," now U.S. Pat. No. 11,582,098, the entirety of which priority application is hereby incorporated by reference herein.

TECHNICAL FIELD

The present disclosure relates to wireless communication networks, and, in particular, to techniques for facilitating modification, addition, creation, and/or deletion of wireless communication network configurations.

BACKGROUND

After a wireless communication network is initially configured, it is desirable in some cases to modify the configuration of the network, e.g., to meet changing needs of the network and/or its users. For example, the security posture of a network could be updated multiple times after initial configuration, e.g., in order to block newly identified rogue actors from attempting to break into the network. As another example, a network configuration can be modified to remedy errors in the initial configuration of a network, e.g., with respect to interface descriptions, policy directives, or the like.

DETAILED DESCRIPTION

Figure 1:
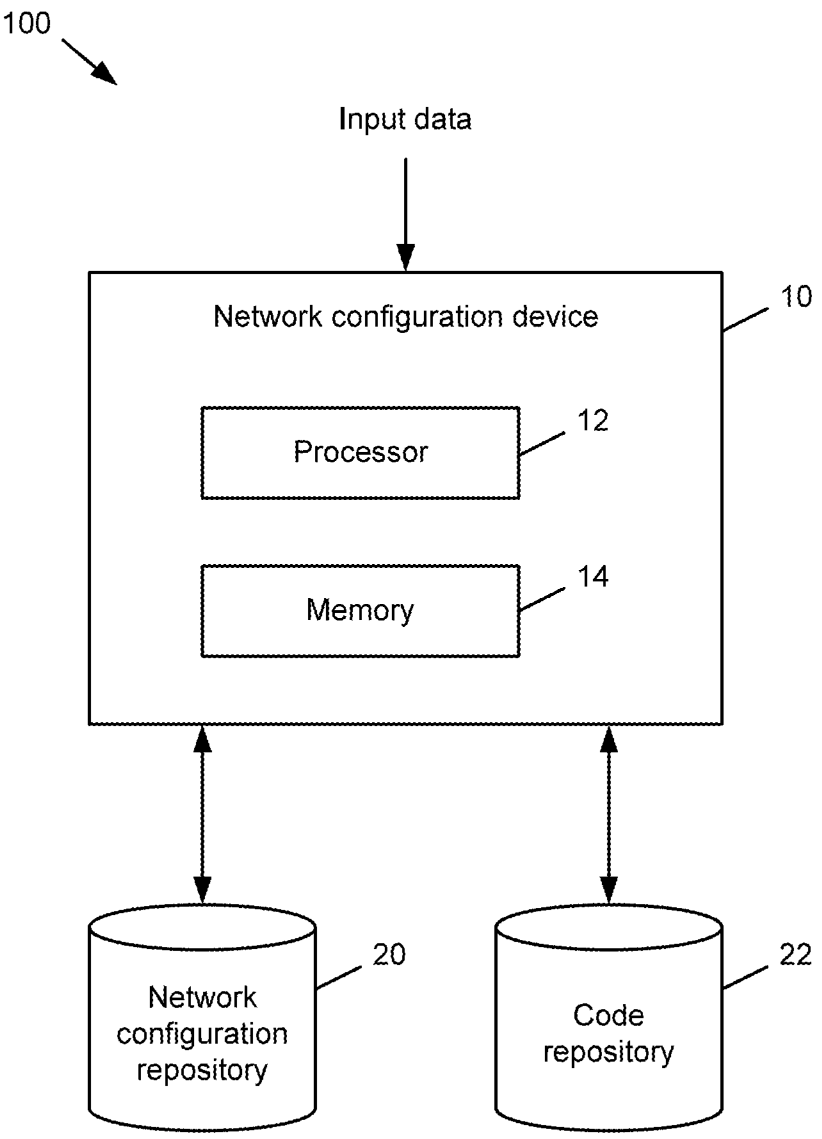
FIG. 1 is a block diagram of a system that facilitates mechanized modify/add/create/delete (MACD) for network configuration in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include creating, by a system including a processor, a data object from input data relating to a requested change to a target network configuration. The data object can include a first parameter indicating a type of the requested change and a second parameter identifying the target network configuration. The method can further include retrieving, by the system from a repository according to a group of logical rules, executable instructions associated with the type of the requested change, as given by the first parameter of the data object, and the target network configuration, as given by the second parameter of the data object. The method can additionally include performing, by the system further according to the group of logical rules, the requested change to the target network configuration, where performing the requested change includes executing the executable instructions retrieved from the repository.

In another aspect, a system as described herein can include a processor and a memory that stores first executable instructions that, when executed by the processor, facilitate performance of operations. The operations can include constructing a data object from input data relating to a requested network configuration change, where the data object includes a first parameter indicating a type of the requested network configuration change and a second parameter indicating a target configuration of the requested network configuration change; retrieving, from a repository according to logical rules, second executable instructions based on the type of the requested network configuration change, as given by the first parameter of the data object, and the target configuration, as given by the second parameter of the data object; and performing, further according to the logical rules, the requested network configuration change, where performing the requested network configuration change includes executing the second executable instructions.

In a further aspect, a non-transitory machine-readable medium as described herein can include first executable instructions that, when executed by a processor, facilitate performance of operations. The operations can include generating a data object from input data received in association with a requested change to a target network configuration, the data object including a first parameter indicating a type of the requested change and a second parameter indicating the target network configuration; obtaining, according to a group of logical rules, second executable instructions from a repository, the second executable instructions being selected based on the type of the requested change, as given by the first parameter of the data object, and the target network configuration, as given by the second parameter of the data object; and performing, further according to the group of logical rules, the requested change to the target network configuration, the performing of the requested change including executing the second executable instructions.

Referring first to FIG. 1, a system 100 that facilitates mechanized modify/add/create/delete (MACD) for network configuration is illustrated. System 100 as shown by FIG. 1 includes a network configuration device 10 that can maintain configurations for various elements of a communication network, e.g., via a network configuration repository 20. A communication network to which the network configuration device 10 is associated can be a network operating according to any suitable wired and/or wireless communication technology, such as a cellular network (e.g., a Fourth Generation (4G) Long Term Evolution (LTE) network, a Fifth Generation (5G) New Radio (NR) network, etc.), a Wireless Fidelity (Wi-Fi) network, a BLUETOOTH® network, a Layer 2 and/or Layer 3 switched network, and/or any other suitable network technology, either presently existing or developed in the future. Also, or alternatively, the network configuration device 10 can maintain configurations for communication via the Internet and/or one or more other suitable internetworks. While various examples provided herein relate to particular network implementations, it is noted that these examples are provided merely for purposes of explanation and that various implementations provided herein are not intended to be limited to a specific network technology unless explicitly stated otherwise.

As used herein, the term "network configuration," or simply "configuration," refers to any configurable property of a communication network that can impact the operation or use of the communication network. Non-limiting examples of network configurations that can be maintained by the network configuration device 10 include network policies or quotas, access control lists and/or other properties that control access to the communication network, descriptions or other network-provided documentation associated with network devices or interfaces, etc. Other suitable configurable properties of a communication network, either presently existing or developed in the future, could also be used. Additionally, the term "MACD" refers to respective types of configuration changes that can be facilitated by the network configuration device 10, e.g., modification of existing data in an existing network configuration, addition of new data to an existing network configuration, creation of a new network configuration, and/or deletion of an existing network configuration.

The network configuration device 10 shown in FIG. 1 can transform the ability to apply network configuration changes into a simple, repeatable solution that is common to all such change request implementations, in effect providing a self-serve configuration capability to developers, customers, and/or other entities associated with an associated communication network. The network configuration device 10 can achieve this, e.g., by utilizing a normalized incoming request data body and a single, once-developed software rule-set to implement the request data for all configuration changes. In an aspect, a given change request can be associated with steering statements and/or other instructions, e.g., as stored by a code repository 22, that defines the incoming change request and the corresponding data set in the network configuration repository 20 to be changed.

By utilizing a static set of logical rules to perform network configuration changes as described herein, the network configuration device 10 can provide a simple, repeatable solution that is common to all change request implementations. In addition to enabling the automation of respective tasks associated with configuration changes that were previously not able to be automated, the network configuration device 10 can facilitate handling of new configuration change types via the static rule set via the addition of new steering statements or instructions, which can significantly reduce development time and/or other resources associated with creating separate custom software for each type of configuration change.

The network configuration device 10 shown in system 100 can include a processor 12 and a memory 14, which can be utilized to facilitate various functions of the network configuration device 10. For instance, the memory 14 can include a non-transitory computer readable medium that contains computer executable instructions, and the processor 12 can execute instructions stored by the memory 14 (e.g., in addition to, or in place of, instructions retrieved from the code repository 22 as described below). For simplicity of explanation, various actions that can be performed via the processor 12 and the memory 14 of the network configuration device 10 are shown and described below with respect to various logical components. In an aspect, the components described herein can be implemented in hardware, software, and/or a combination of hardware and software. For instance, a logical component as described herein can be implemented via instructions stored on the memory 14 and executed by the processor 12. Other implementations of various logical components could also be used, as will be described in further detail where applicable.

While the network configuration repository 20 and the code repository 22 are illustrated separately from the network configuration device 10 in FIG. 1, it is noted that either of the repositories 20, 22 could be implemented, wholly or in part, at the network configuration device 10 as described herein. Additionally, while specific references are made herein to specific technologies, programming languages, etc., it is noted that these references are provided merely by way of example and that other technologies, programming languages, etc., could also be used.

Figure 2:
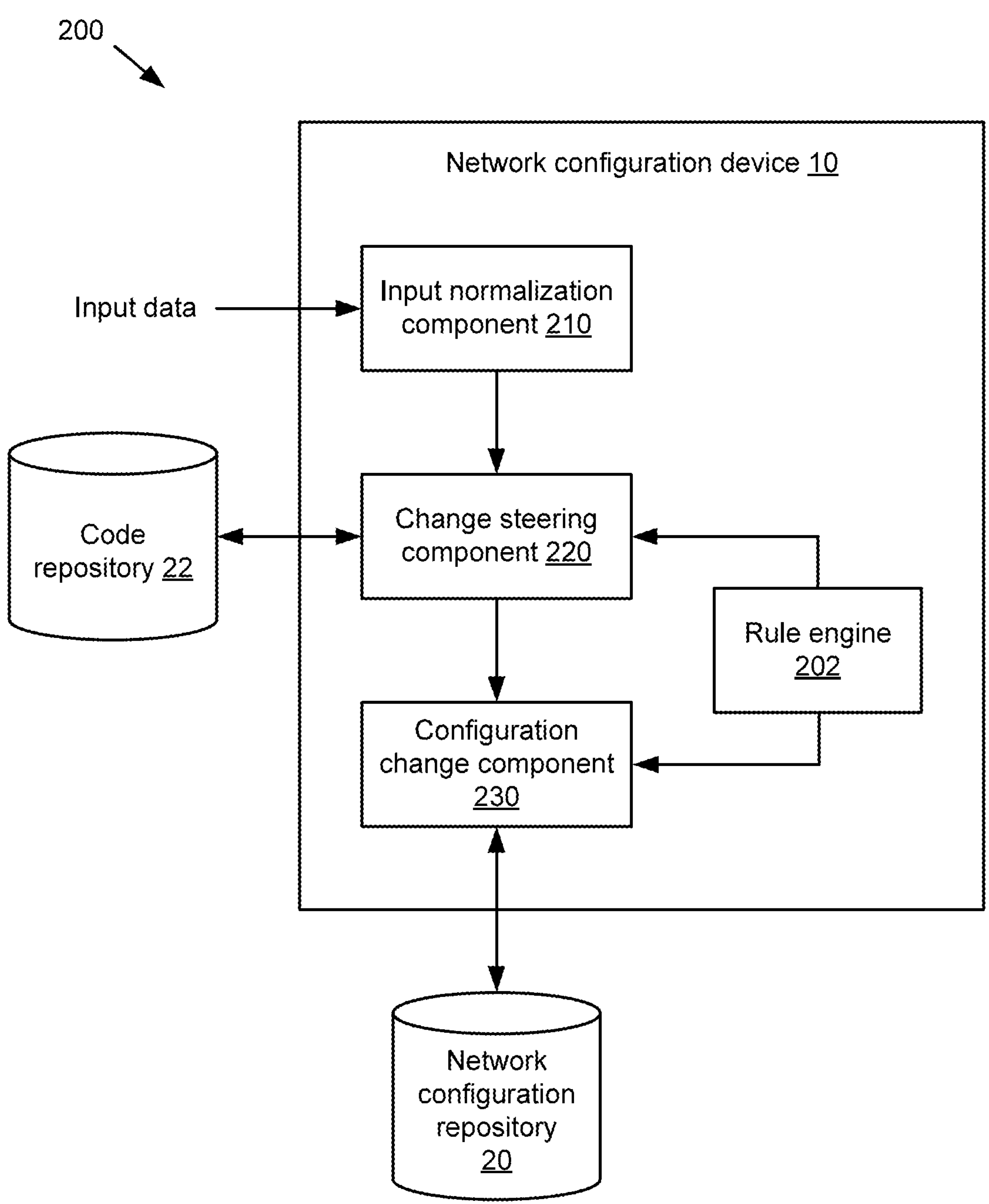
FIG. 2 is a block diagram that depicts the functionality of the network configuration device of FIG. 1 in further detail in accordance with various aspects described herein.

With reference now to FIG. 2, a block diagram of a system 200 that facilitates mechanized MACD for network configuration in accordance with various aspects described herein is illustrated. Repetitive description of like elements employed in other embodiments described herein is omitted for sake of brevity. System 200 as shown in FIG. 2 includes a network configuration device 10 that can operate in a similar manner to that described above with respect to FIG. 1. As further shown in FIG. 2, the network configuration device 10 includes an input normalization component 210 that can create a data object from input data relating to a requested change to a target network configuration. Input data can be provided to the input normalization component 210 in any suitable manner, such as via a spreadsheet or other input form that is tailored to a given requested change type. Techniques for generating an input form in this manner are described in further detail below with respect to FIG. 3.

In an aspect, a requested change to a target network configuration can be defined based on a type of the requested change (e.g., modify, add, create, or delete, also referred to herein as a MACD type) as well as the target network configuration. Thus, by way of example, a request to change information within a description of a network interface can be defined as "update (or modify) interface description." As another example, a request to create a new access list (e.g., for a new network deployment, etc.) can be defined as "create access list." Other change type definitions based on similar definitions are also possible.

In another aspect, the data object generated by the input normalization component 210 can be formatted according to a common format for all change request types. For example, the input normalization component 210 can generate the data object in JavaScript Object Notation (JSON) format. An example of a JSON object that can be generated in this manner is described in further detail below with respect to FIG. 4. It is noted, however, that other object types could also be used.

Regardless of the format utilized by the input normalization component 210 to generate the data object, the data object can include respective parameters to guide subsequent operation of the network configuration device 10. These parameters can include, for example, a first parameter that indicates the MACD type of the requested change and a second parameter that identifies or otherwise indicates the target network configuration of the requested change. Other parameters could also be used in addition to, or in place of, these parameters.

The network configuration device 10 shown in FIG. 2 further includes a change steering component 220 that can retrieve, according to a group of logical rules provided by a rule engine 202, executable instructions (steering statements) associated with the requested change from a code repository 22 or other suitable source. In an aspect, the change steering component 220 can retrieve instructions associated with a given requested configuration change according to the parameters of the associated data object generated by the input normalization component 210. For instance, the change steering component 220 can retrieve instructions based on a type of the requested change, as given by a first parameter of the data object, and a target network configuration for the requested change, as given by a second parameter of the data object.

As additionally shown in FIG. 2, the network configuration device 10 of system 200 also includes a configuration change component 230 that can perform, further according to the group of logical rules provided by the rule engine 202, a requested configuration change at least in part by executing the steering statements or other instructions retrieved from the code repository 22 by the change steering component 220. In an implementation, the configuration change component 230 can perform a requested configuration change by locating and modifying one or more records of a configuration database, e.g., a configuration database stored by a network configuration repository 20. Example database operations that can be performed by the configuration change component 230 are described in further detail below with respect to FIG. 6.

By enabling network configurations to be changed via the execution of steering statements as described herein, the network configuration device 10 of system 200 can facilitate modular support for generic configuration changes, e.g., via a once-developed set of rules implemented by the rule engine 202. For instance, as will be described below with respect to FIG. 5, new change types can be supported on the fly via the addition of a set of common-knowledge statements, e.g., Structured Query Language (SQL) statements and/or other statements of other languages as generally known in the art, that express the change nuances, in addition to the data to be changed itself (e.g., the data to add, delete, or update). As a result, the network configuration device 10 can facilitate the addition of new change types with significantly less development time and/or resources as compared to developing individual software for each requested change type.

Figure 3:
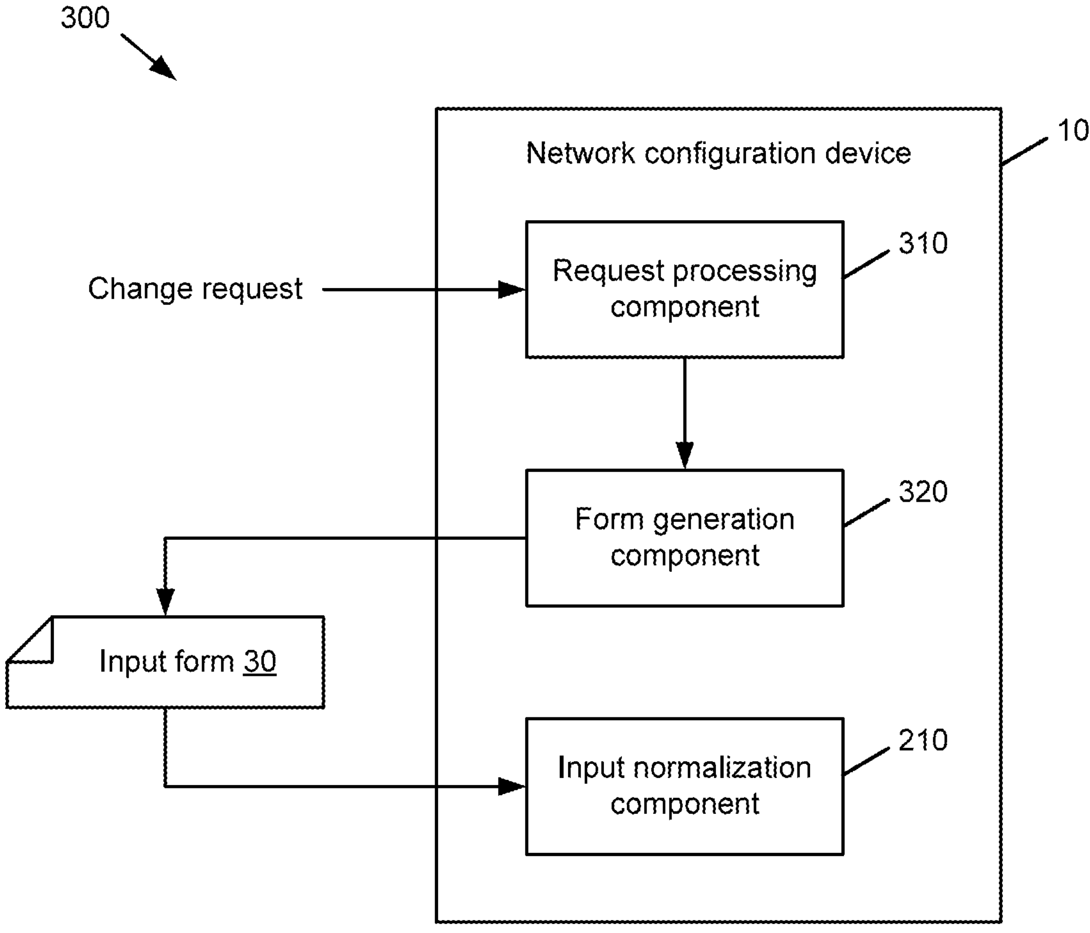
FIG. 3 is a block diagram of a system that facilitates soliciting and receiving user input with respect to a requested network configuration change in accordance with various aspects described herein.

Referring now to FIG. 3, a block diagram of a system 300 that facilitates soliciting and receiving user input with respect to a requested network configuration change is illustrated. Repetitive description of like elements employed in other embodiments described herein is omitted for sake of brevity. System 300 as shown in FIG. 3 includes a network configuration device 10, e.g., as described above, which includes a request processing component 310 that can receive a request for a configuration change. The network configuration device 10 of system 300 further includes a form generation component 320 that can generate an input form 30 in response to the request processing component 310 receiving a change request.

In an implementation, the request processing component 310, and/or other components of the network configuration device 10, can maintain a list of supported change types that can be retrieved, e.g., by a network user, in the event that a network configuration change is desired. As noted above, respective change types can be defined both by the MACD type associated with a given change as well as the target configuration of the change. Accordingly, a change request as received by the request processing component 310 can indicate a selection of a supported change type from the list provided by the request processing component 310. In the event that a non-supported change type is requested, e.g., a change type not present in the list of supported change types, a new change type can be added as described below with respect to FIG. 5. In some implementations, selection of a change type can be separated into multiple stages, e.g., a first selection of a supported target configuration followed by a second selection of a supported MACD type for the selected target configuration. Other techniques could also be used.

Upon receiving a request for a supported change type, the form generation component 320 can render the input form 30 as a skeleton (empty) form that contains fields to be filled in with the data to be changed (e.g., added, deleted, updated). In an implementation, the input form 30 can be generated as a spreadsheet that contains the fields to be completed in respective cells of the spreadsheet. Other implementations are also possible.

In an aspect, the form generation component 320 can generate the fields of a given input form 30 based on the specific properties associated with the requested change. By way of non-limiting example, an input form 30 for a request to modify an interface description could contain fields for the interface(s) for which description modifications are desired as well as the desired updated text for those description(s). In some implementations, the form generation component 320 can populate fields of the input form 30 with pre-change information associated with a target configuration, e.g., information for the target configuration as it exists prior to the requested change, to facilitate a user or other entity to indicate the desired change(s) by modifying the populated information. Thus, in the above example of an interface description, the input form 30 could be pre-populated with the existing description text such that a desired change can be indicated via modifying the pre-populated text.

Upon completion of the input form 30, the input form 30 can be submitted back to the network configuration device 10 for processing, at which time the input normalization component 210 can normalize the form data, e.g., into a data object and/or data of another suitable format, for further processing. By generating and utilizing an input form 30 as shown in FIG. 3, the network configuration device 10 of system 300 can provide an intent-based technique for modifying configuration changes in an easy-to-understand way that does not expose users to unnecessary amounts of technical detail. In this way, the network configuration device 10 can enable configuration changes to be performed by a user without requiring the user to know or research details such as the format of the incoming data, the relationships among the incoming data elements, the mapping of the incoming data to the underlying network configuration data schematic and model, the relationships between the data elements in the schema such as foreign_key constraints, and so on. In contrast, the network configuration device 10 can enable configuration changes to be made using syntax that is commonly understood in the art, such as SQL, as well as a simple spreadsheet format and/or other input format that is intuitive and simple to use.

Figure 4:
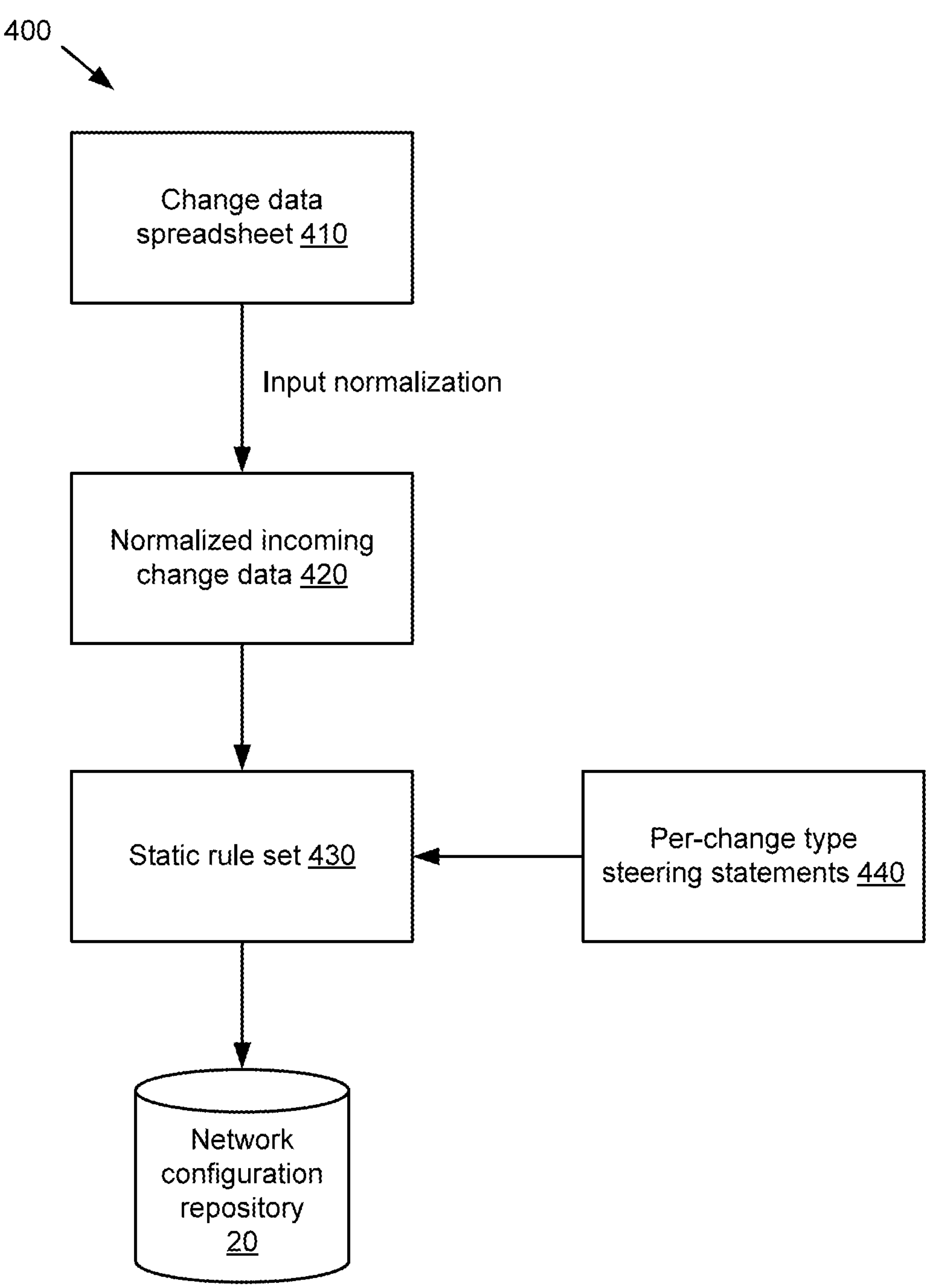
FIG. 4 is a diagram that depicts an example data flow that can be utilized to facilitate a network configuration change in accordance with various aspects described herein.

Turning to FIG. 4, diagram 400 depicts an example data flow that can be utilized to facilitate a network configuration change based on an incoming change data spreadsheet 410, e.g., a completed input form 30 as described above with respect to FIG. 3 that is provided in a spreadsheet format. It is noted that a spreadsheet is merely one example of an input format that could be used, and that other formats could be processed as shown by diagram 400 in a similar manner without departing from the description below.

As shown in diagram 400, an incoming change data spreadsheet 410 can be processed (e.g., by an input normalization component 210 as described above) in order to generate normalized incoming change data 420. In an implementation, the normalized incoming change data 420 can be structured as a data object, e.g., a data object in JSON format. An example format template that can be utilized for a JSON data object in this manner is provided in Table 1 below. It is noted, however, that other data objects and/or formats could also be used.

TABLE 1

Example JSON object format for normalized incoming change data.

```
[
  {
    "change_list": [
      {
        "change_type": "<change_type>",
        "parameters":
          {
            "name": "<name>".
            "value": "<value>",
          },
          {...}
      }]
      [...],
  }]
```

As further shown by diagram 400, a static rule set 430 (e.g., a rule set associated with a rule engine 202 as described above) can be utilized to process the normalized incoming change data 420, e.g., by retrieving steering statements 440 and/or other instructions associated with the MACD type and/or target of the requested change associated with the normalized incoming change data 420, e.g., from an application programming interface (API) repository, a SQL repository, and/or another suitable code repository 22 as described above. In an aspect, the steering statements 440 can represent a sequence of queries and/or changes to one or more database records and/or other data to be performed in order to effectuate the requested change. The operation of the steering statements 440 with respect to respective records of a database is further described below with respect to FIG. 6.

In an aspect, the static rule set 430 can further be employed to execute the steering statements 440, as retrieved for a specific requested change type, in order to make the appropriate changes to a prior set of the network configuration data. Subsequently, the result of these changes, e.g., a success or failure of the changes, can be returned, e.g., to a user that made the configuration change request.

Figure 5:
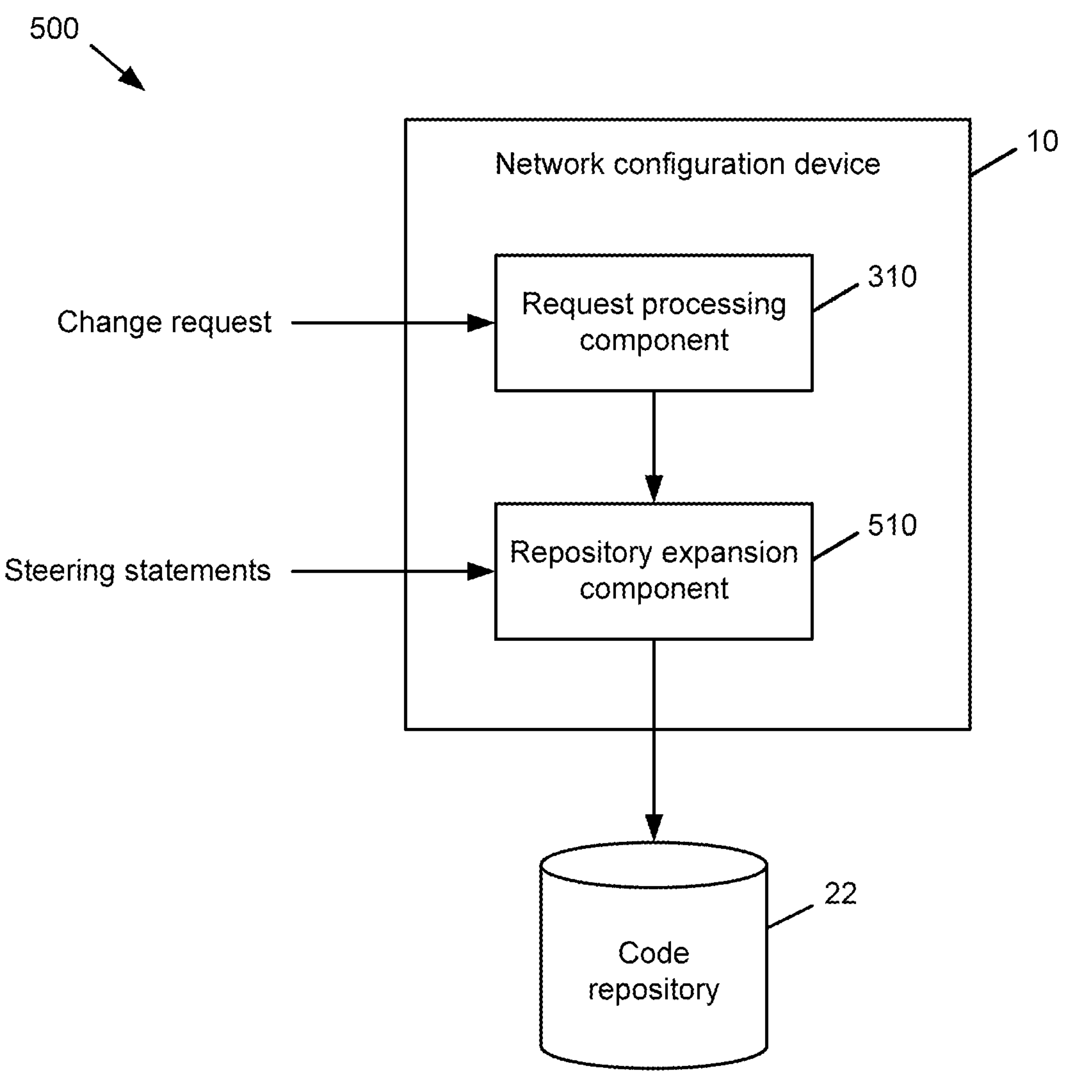
FIG. 5 is a block diagram of a system that facilitates definition of a new network configuration change type in accordance with various aspects described herein.

With reference next to FIG. 5, a block diagram of a system 500 that facilitates definition of a new network configuration change type is illustrated. Repetitive description of like elements employed in other embodiments described herein is omitted for sake of brevity. System 500 as shown in FIG. 5 includes a network configuration device 10 with a request processing component 310, which can process a request for a change to a network configuration, e.g., as described above with respect to FIG. 3.

The network configuration device 10 in system 500 further includes a repository expansion component 510 that can facilitate the addition of steering statements and/or other executable instructions associated with a requested configuration change of a new type, e.g., a type corresponding to a requested change to a target network configuration for which steering statements or other instructions are not present at an associated code repository 22. In an implementation, addition of a new change type as shown by FIG. 5 can occur in response to receiving a request for a configuration change of a presently unsupported type. Also or alternatively, a new change type can be added as shown by FIG. 5 via a standalone process.

As noted above, the network configuration device 10 can utilize a combination of once-built code (e.g., logical rules implemented via the rule engine 202 of system 200) and reused code, and this combination of code can include input normalization code (e.g., as employed by the input normalization component 210) as well as the execution ruleset for performing configuration changes. The normalization code can be built once for processing any rendered input format, e.g., any rendered skeleton spreadsheet format as described above with respect to FIG. 3, and transforming the rendered input into a normalized formatted structure, such as the JSON object shown in Table 1 above and/or another suitable structure.

The execution ruleset can be built once and utilize a reference-pointer based methodology to retrieve data elements within the context of the normalized input, e.g., the "parameters" object of the normalized JSON object shown in Table 1 and/or another suitable structure. Once the data elements are retrieved, the execution ruleset can utilize per-type steering statements to query as well as change (e.g., add, delete, update) the incoming data into an associated network configuration repository 20 (not shown in FIG. 5).

In an aspect, the repository expansion component 510 of the network configuration device 10 as shown in FIG. 5 can accept (e.g., from a user or other entity) steering statements as input corresponding to a new configuration change type. Alternatively, the repository expansion component 510 can generate steering statements for a new change type, e.g., based on steering statements present in the code repository 22 for a similar change type and/or by other means. The repository expansion component 510 can also facilitate testing and/or other pre-deployment operations on incoming steering statements prior to addition of the steering statements to the code repository 22.

Figure 6:
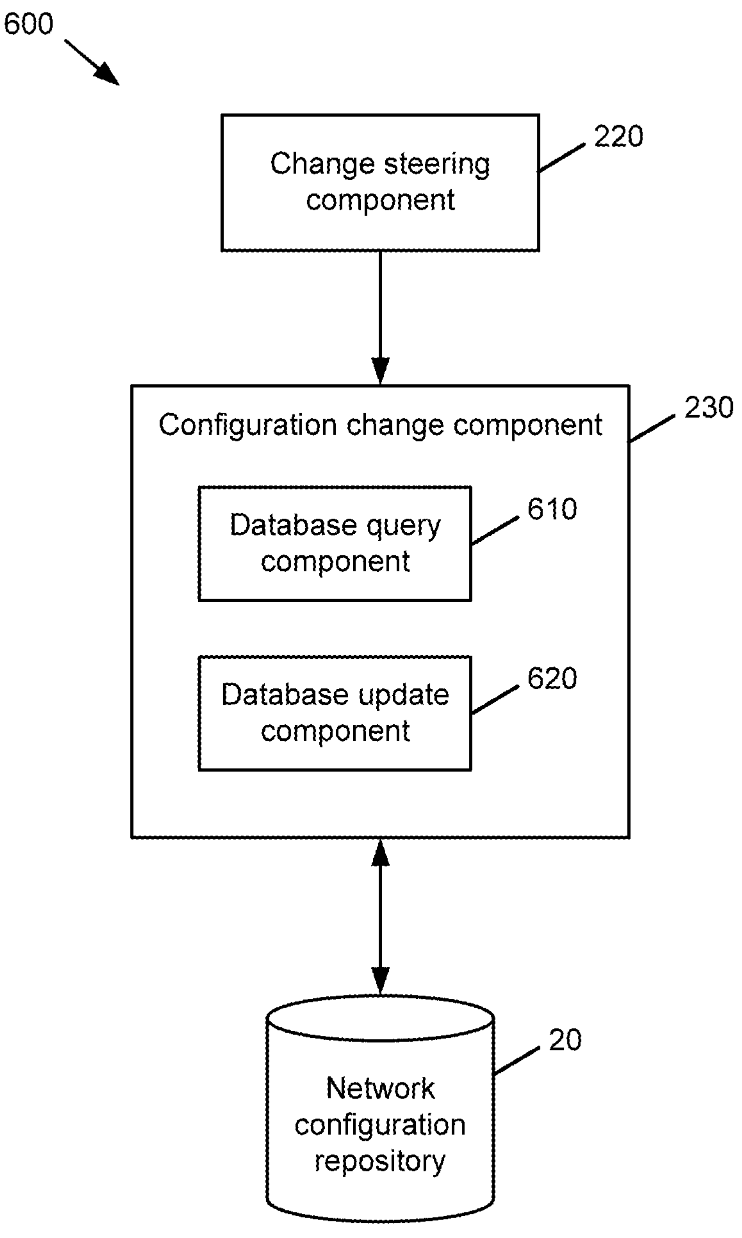
FIG. 6 is a block diagram of a system that facilitates database updates in connection with a network configuration change in accordance with various aspects described herein.

Turning next to FIG. 6, a block diagram of a system 600 that facilitates database updates in connection with a network configuration change is illustrated. Repetitive description of like elements employed in other embodiments described herein is omitted for sake of brevity. System 600 as shown in FIG. 6 includes a change steering component 220 that can facilitate generation and/or retrieval of steering statements, e.g., as described above, and a configuration change component 230 that can perform a requested configuration change, e.g., by executing steering statements provided by the change steering component 220.

In an implementation in which the network configuration repository 20 shown in FIG. 6 is implemented via one or more databases, e.g., the network configuration repository 20 is a SQL repository, a NoSQL repository, or the like, the steering statements associated with a given change type can provide a framework for the configuration change component 230 to implement the requested change via database operations performed at the network configuration repository 20. To this end, the configuration change component 230 shown in FIG. 6 includes a database query component 610 that can locate, in a database associated with the network configuration repository 20, respective records associated with a target network configuration, and a database update component 620 that can update at least one of those respective records, e.g., based on input data relating to a requested change.

In an aspect, the steering statements provided by the change steering component 220 for a requested configuration change can provide a framework by which the database query component 610 and the database update component 620 can modify configurations stored in the network configuration repository 20. For instance, steering statements associated with a change type can relate to one or more of the following:

1) The database queries for retrieving data associated with a target network configuration, e.g., to determine data associated with the configuration to be changed.
2) The change statements (e.g., add, delete, update) for modifying the contents of the network configuration repository 20, e.g., per user direction and/or other input.
3) The sequence in which to execute the above statements.

In another aspect, the steering statements associated with a given change type can be utilized to define potentially complex relationships between databases and/or database objects in a manner that does not expose the complexity of those relationships to a requesting user. By way of non-limiting example, the steering statements associated with updating a description of an interface on a given network device can define relationships between the device to be updated, the location in the network where the device resides, neighboring components associated with the device, and/or other properties which could be stored in multiple, disjoint tables of the network configuration repository 20. These steering statements can then be utilized in combination with input provided via an input form (e.g., as described above with respect to FIG. 3) to facilitate updating the interface description without requiring a requesting user or other entity to manually define the relationships represented by the steering statements.

Figure 7:
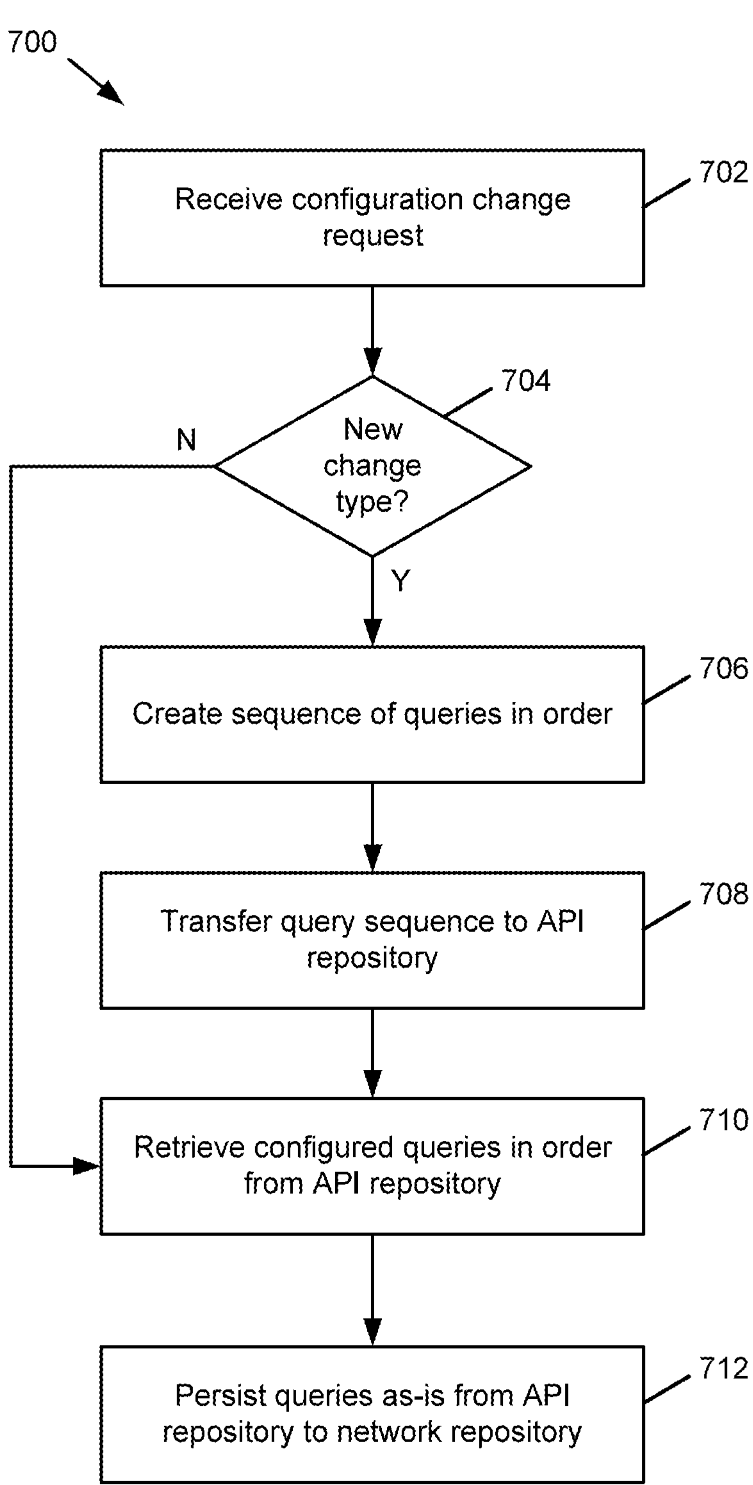
FIG. 7 is a flow diagram of a method that facilitates mechanized MACD for network configuration in accordance with various aspects described herein.

Turning next to FIG. 7, a flow diagram of a method 700 that facilitates mechanized MACD for network configuration is presented. At 702, a configuration change request is received (e.g., via an input form 30 as shown in FIG. 3, and/or by other means). At 704, if the configuration change request received at 702 is associated with a new (unsupported) change type, method 700 can proceed from 704 to 706, in which a rule engine (e.g., a rule engine 202) and/or an API repository (e.g., a code repository 22) can be configured by creating a sequence of queries and/or other steering statements in a specified order. At 708, the queries and/or steering statements generated at 706 can subsequently be transferred to the API repository.

Following the actions shown at 708, or in response to the configuration change request received at 702 being determined at 704 to be associated with an existing (supported) change type, method 700 can proceed to 710, in which configured queries and/or other steering statements are retrieved (e.g., by the rule engine 202) from the API repository in the order specified by the steering statements.

At 710, the configuration change requested at 702 can be performed by persisting the queries and/or other steering statements retrieved at 710, e.g., in an as-is state, from the API repository to a corresponding network configuration repository (e.g., network configuration repository 20).

Figure 8:
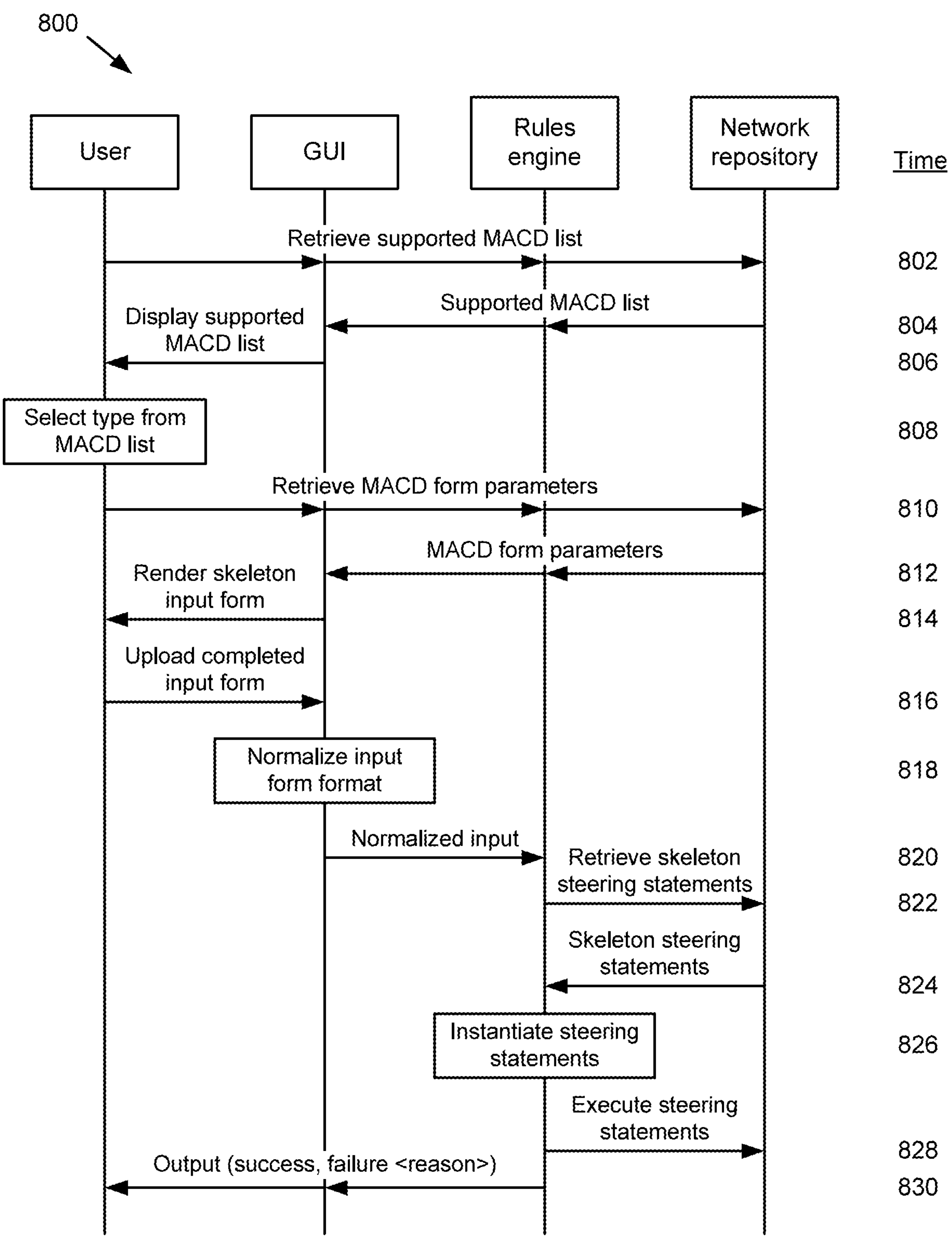
FIG. 8 is a diagram depicting an example messaging flow for implementing a network configuration change in accordance with various aspects described herein.

Referring now to FIG. 8, a diagram 800 depicting an example messaging flow for implementing a network configuration change is illustrated. More particularly, the messaging flow illustrated by diagram 800 shows a series of example interactions between a user, a graphical user interface (GUI) presented to the user, a rules engine (e.g., rule engine 202), and a network repository (e.g., network configuration repository 20) in connection with performing a configuration change based on a preconfigured change type. It is noted that a new change type could also be implemented using similar messaging flows to those shown by diagram 800, e.g., with additional messaging flows for adding support for the new change type occurring before the illustrated interactions. It is further noted that while diagram 800 illustrates an example involving human-to-GUI interactions, some or all of the processing steps shown by diagram 800 could be performed via automated or semi-automated interactions between computing devices with limited or no human user interaction.

At time 802, a user desiring to request a change to a network configuration can input, via the GUI, a request to retrieve the list of supported MACD operations. This request can then be provided to the network repository via the rules engine. At time 804, the supported MACD list is retrieved from the network repository and sent to the GUI via the rules engine. The GUI can then display a visual representation of the MACD list, e.g., via a menu, a drop-down selection, etc., to the user.

At time 808, the user can select, via the GUI, the desired change type from the MACD list. In response to this selection, at time 810 the GUI can request the form parameters associated with the requested change type from the network repository via the rules engine. At time 812, the retrieved form parameters can be provided by the network repository to the GUI.

At time 814, the GUI can render a skeleton input form, e.g., a spreadsheet and/or a form in another suitable format, based on the form parameters provided to the GUI at time 812. In an aspect, the skeleton form rendered at 814 can include respective fields that indicate the information needed to perform the requested change. The fields rendered at time 814 can vary depending on the type of change selected at time 808. Additionally, the fields can include mandatory fields and/or optional fields.

At time 816, the user can complete the skeleton input form rendered at time 814 and upload the completed form via the GUI. The GUI can then normalize the input form at time 818 to a uniform data object and/or another suitable format. The normalized input can be provided by the GUI to the rules engine at time 820, in response to which the rules engine can request skeleton steering statements from the network repository at time 822.

At time 824, the network repository can return the skeleton steering statements requested by the rules engine at time 822. The rules engine can then instantiate the retrieved steering statements at time 826, e.g., based on the input data provided via the completed input form at time 816. Once the steering statements are instantiated, the rules engine can effectuate the requested change at time 828 by executing the instantiated steering statements.

At time 830, the rules engine can indicate the success or failure of the requested change to the user via the GUI. If the request failed, e.g., due to unavailability of the repository, errors present in the steering statements, and/or other reasons, the rules engine can indicate the reason(s) for the failure via the GUI. Additionally, if the user enters an invalid input (e.g., an erroneous input, an attempt to change a configuration that does not exist, an attempt to add a configuration that already exists, etc.) via the GUI at any point during the flow illustrated by diagram 800, the GUI can inform the user of the error in order to enable the user to provide appropriate corrections.

Figure 9:
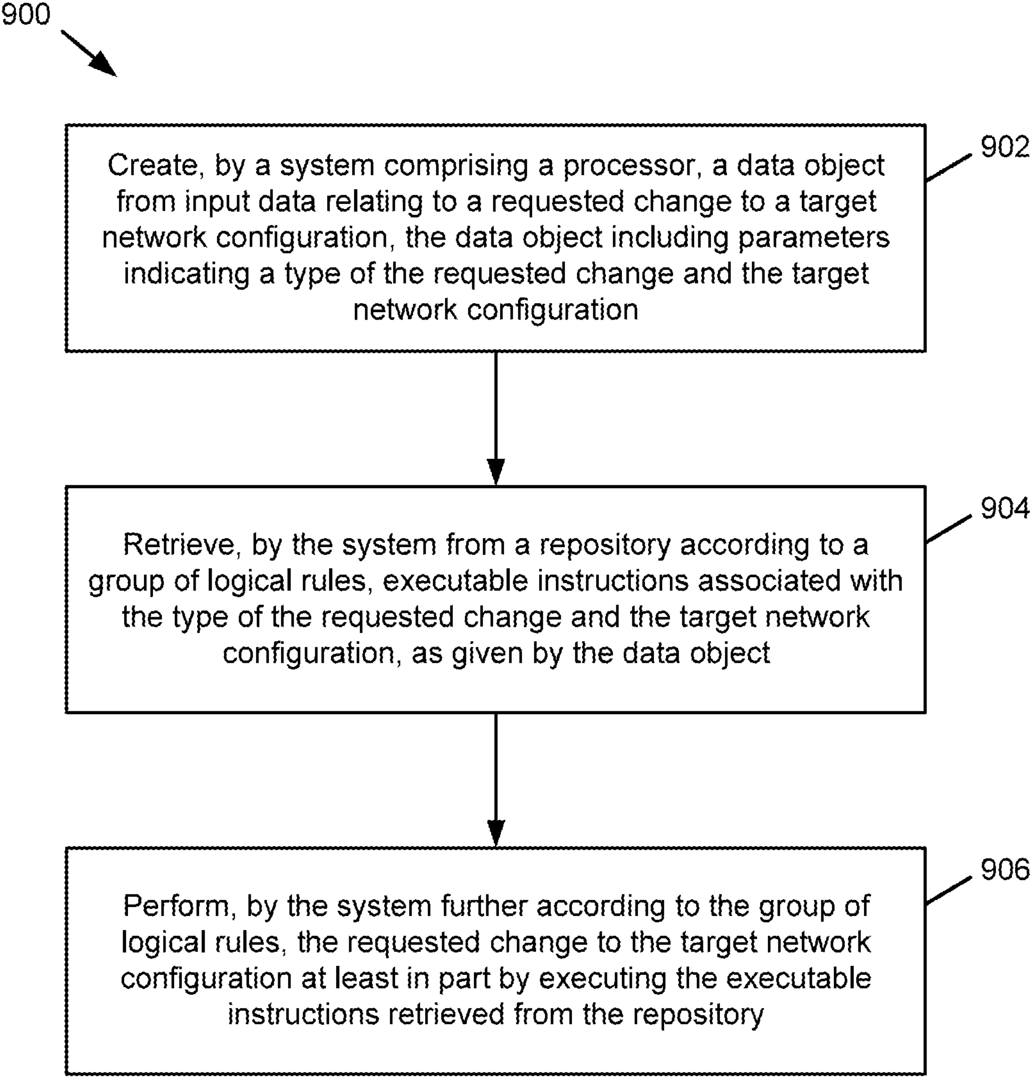
FIGS. 9-10 are flow diagrams of respective methods that facilitate mechanized MACD for network configuration in accordance with various aspects described herein.

With reference now to FIG. 9, a flow diagram of a method 900 that facilitates mechanized MACD for network configuration is presented. At 902, a system comprising a processor (e.g., a network configuration device 10 comprising a processor 12, and/or a system including such a device) can create (e.g., by an input normalization component 210 and/or other components implemented by the processor 12) a data object from input data relating to a requested change to a target network configuration (e.g., a network configuration stored at a network configuration repository 20). The data object can include, e.g., a first parameter that indicates a type of the requested change and a second parameters that indicates the target network configuration.

At 904, the system can retrieve (e.g., by a change steering component 220 and/or other components implemented by the processor 12), from a repository (e.g., a code repository 22) according to a group of logical rules (e.g., logical rules implemented via a rule engine 202), executable instructions associated with the type of the requested change, as given by the first parameter of the data object created at 902, and the target network configuration, as given by the second parameter of the data object.

At 906, the system can perform (e.g., by a configuration change component 230 and/or other components implemented by the processor 12), further according to the group of logical rules, the change to the target network configuration as requested at 902 at least in part by executing the executable instructions retrieved from the repository at 904.

Figure 10:
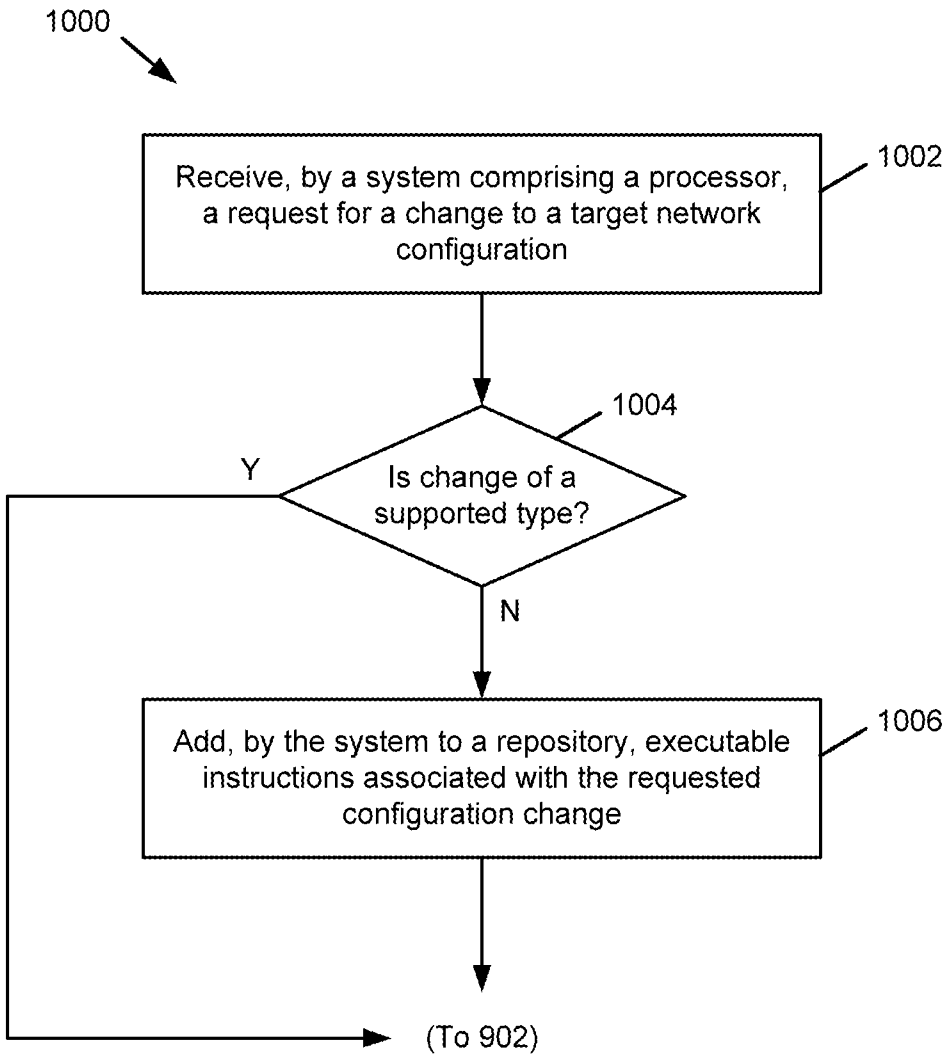

Referring next to FIG. 10, a flow diagram of another method 1000 that facilitates mechanized MACD for network configuration is presented. At 1002, a system comprising a processor (e.g., a network configuration device 10 comprising a processor 12, and/or a system including such a device) can receive (e.g., by a request processing component 310 and/or other components implemented by the processor 12) a request for a change to a target network configuration.

At 1004, the system can determine whether the change requested at 1002 is of a supported type (i.e., whether steering statements or other executable instructions associated with the requested change are present in an associated code repository 22). If the change requested at 1002 is not of a supported type, method 1000 can proceed from 1004 to 1006, in which the system can add (e.g., by a repository expansion component 510 and/or other components implemented by the processor 12), to a repository (e.g., code repository 22), executable instructions associated with the requested configuration change. Upon adding the executable instructions for the change type at 1006, or in response to the requested change being determined at 1004 to be of a supported type, the system can facilitate performing the requested configuration change, e.g., via method 900 as described above.

FIGS. 7 and 9-10 illustrate methods in accordance with certain aspects of this disclosure. While, for purposes of simplicity of explanation, the methods are shown and described as a series of acts, it is noted that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 11:
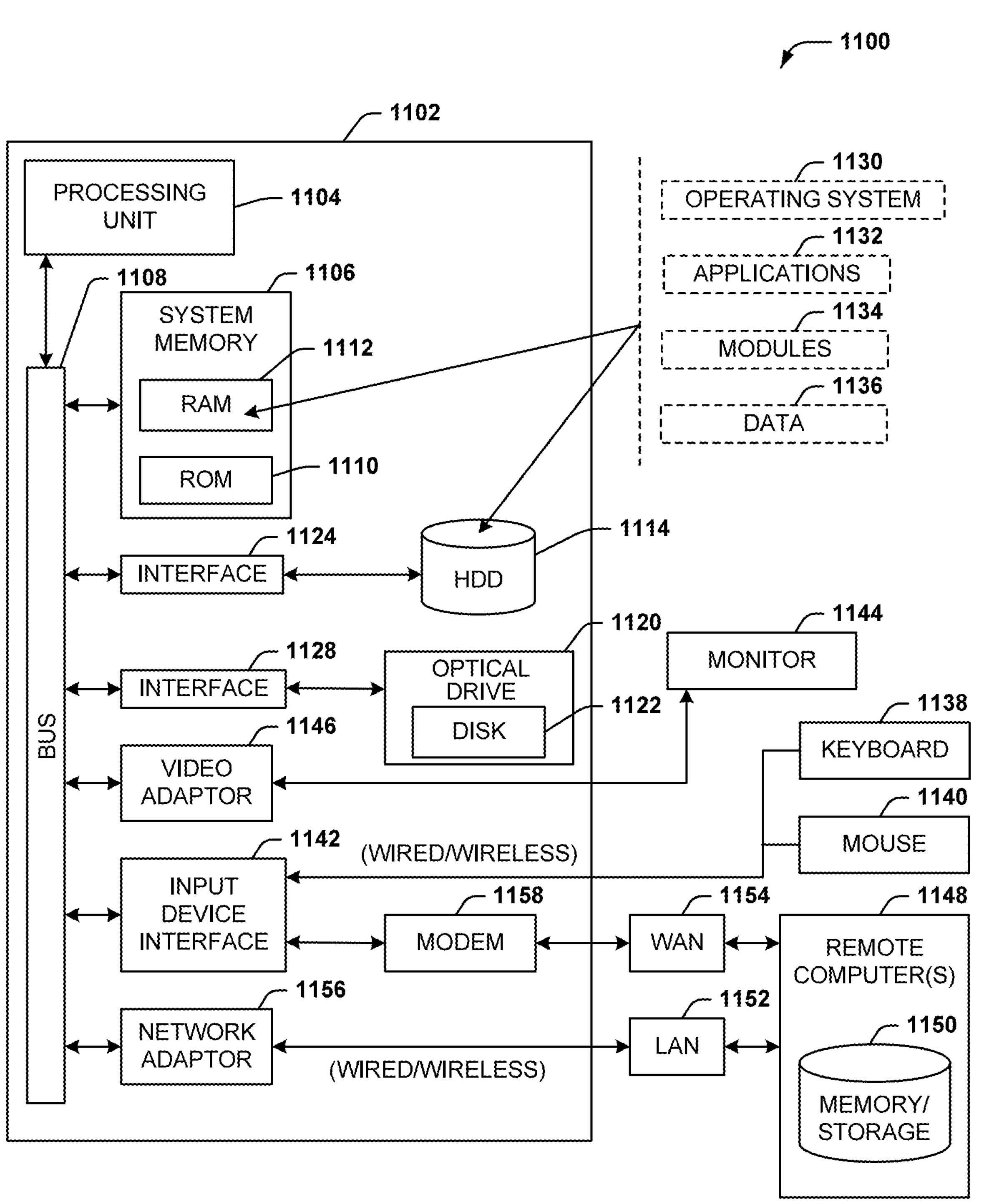
FIG. 11 depicts an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 and an optical disk drive 1120, (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114 and optical disk drive 1120 can be connected to the system bus 1108 by an HDD interface 1124 and an optical drive interface 1128, respectively. The HDD interface 1124 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it is noted by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a USB port, an IR interface, a BLUETOOTH® interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the wireless adapter 1156.

When used in a WAN networking environment, the computer 1102 can include a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a device comprising a processor, a requested change to a network configuration, wherein the requested change to the network configuration is of a first change type;

determining, by the device, that the first change type is absent from a list of supported change types maintained by the device, and responsive to the determining, facilitating generation of steering statements for the first change type, wherein the generation comprises automatically deriving the steering statements based on contextual relationships to existing change types or accepting manual input defining the steering statements;

adding, by the device to an application programming interface (API) repository and according to a group of logical rules, the steering statements for the first change type, the steering statements comprising query statements and change statements, wherein the steering statements define relationships between multiple tables of a network configuration repository, including relationships between devices, locations, and neighboring components, and wherein the group of logical rules comprises a static rule set that is common to all change request implementations;

executing, by the device, the query statements to locate records associated with the first change type; and executing, by the device, the change statements to modify the records to change the network configuration.

2. The method of claim 1, wherein the adding of the steering statements comprises adding the steering statements based on the first change type.

3. The method of claim 2, wherein the first change type includes information selected from a group of change types comprising modification of existing data associated with the network configuration, addition of new data associated with the network configuration, creation of the network configuration, and deletion of the network configuration.

4. The method of claim 1, further comprising:

receiving, by the device, input data indicative of the requested change to the network configuration, wherein the adding of the steering statements comprises adding the steering statements based on the input data.

5. The method of claim 4, further comprising:

responsive to the determining that the first change type is a supported change type, generating, by the device, an input form that contains fields to be filled in with data to be changed, wherein the fields are based on specific properties associated with the requested change, and wherein the receiving of the input data comprises receiving the input data via the input form.

6. The method of claim 1, wherein the records are stored among tables in a second repository, and wherein the steering statements define relationships between respective ones of the tables.

7. The method of claim 1, wherein the steering statements further comprise a sequence in which to execute the query statements and the change statements.

8. The method of claim 1, wherein the requested change is a first requested change, wherein the network configuration is a first network configuration, wherein the steering statements are first steering statements, and wherein the method further comprises:

adding, by the device to the API repository, second steering statements associated with a second requested change to a second network configuration in response to the second steering statements being determined to be absent from the API repository.

9. The method of claim 8, wherein the adding of the second steering statements comprises adding the second steering statements to the API repository in further response to receiving a request for the second requested change to the second network configuration.

10. A system, comprising:

a processor; and a memory that stores first executable instructions that, when executed by the processor, facilitate performance of operations, comprising:

receiving a requested change to a network configuration, wherein the requested change to the network configuration is of a first change type;

determining that the first change type is absent from a list of supported change types maintained by the system, and responsive to the determining, facilitating generation of steering statements for the first change type, wherein the generation comprises automatically deriving the steering statements based on contextual relationships to existing change types or accepting manual input defining the steering statements;

adding, to an application programming interface (API) repository and according to logical rules, the steering statements for the first change type, wherein the steering statements comprise query statements and change statements, wherein the steering statements define relationships between multiple tables of a network configuration repository, including relationships between devices, locations, and neighboring components, and wherein the logical rules comprises a static rule set that is common to all change request implementations;

executing the query statements to locate the records associated with the first change type; and executing the change statements to modify the records to change the network configuration.

11. The system of claim 10, wherein the adding of the steering statements comprises adding the steering statements based on the first change type.

12. The system of claim 11, wherein the first change type includes information selected from a group of types comprising modification of existing data associated with the network configuration, addition of new data associated with the network configuration, creation of the network configuration, and deletion of the network configuration.

13. The system of claim 10, wherein the operations further comprise:

receiving input data, the input data comprising a description of the requested change to the network configuration, wherein the adding of the steering statements is based on the input data.

14. The system of claim 10, wherein the records are stored among a group of tables in a second repository, and wherein the steering statements define relationships between respective ones of the group of tables.

15. The system of claim 10, wherein the steering statements further comprise a sequence in which to execute the query statements and the change statements.

16. A non-transitory machine-readable medium, comprising first executable instructions that, when executed by a processor, facilitate performance of operations, comprising:

receiving a requested change to a target network configuration, wherein the requested change to the target network configuration is of a first change type;

determining that the first change type absent from a maintained list of supported change types, and responsive to the determining, facilitating generation of steering statements for the first change type, wherein the generation comprises automatically deriving the steering statements based on contextual relationships to existing change types or accepting manual input defining the steering statements;

adding to a code repository according to a group of logical rules, the steering statements for the first change type, and wherein the steering statements comprise query statements and change statements, wherein the steering statements define relationships between multiple tables of a network configuration repository, including relationships between devices, locations, and neighboring components, and wherein the group of logical rules comprises a static rule set that is common to all change request implementations;

executing the query statements associated with the first change type to locate records; and executing the change statements to modify the records to change the target network configuration.

17. The non-transitory machine-readable medium of claim 16, wherein the adding of the steering statements comprises adding the steering statements based on the first change type.

18. The non-transitory machine-readable medium of claim 17, wherein the first change type includes information selected from a group of types comprising modification of existing data associated with the target network configuration, addition of new data associated with the target network configuration, creation of the target network configuration, and deletion of the target network configuration.

19. The non-transitory machine-readable medium of claim 16, wherein the records are stored among tables in a configuration repository, and wherein the steering statements define relationships between respective ones of the tables.

20. The non-transitory machine-readable medium of claim 16, wherein the steering statements further comprise a sequence in which to execute the query statements and the change statements.

* * * * *